(12) United States Patent
Tsai

(10) Patent No.: US 8,378,980 B2
(45) Date of Patent: Feb. 19, 2013

(54) INPUT METHOD USING A TOUCHSCREEN OF AN ELECTRONIC DEVICE

(75) Inventor: Chieh-Chih Tsai, Taipei Hsien (TW)

(73) Assignee: Acer Incorporated, Taipei Hsien (TW)

( * ) Notice: Subject to any disclaimer, the term of this patent is extended or adjusted under 35 U.S.C. 154(b) by 645 days.

(21) Appl. No.: 12/370,120

(22) Filed: Feb. 12, 2009

(65) Prior Publication Data

US 2010/0007617 A1    Jan. 14, 2010

(30) Foreign Application Priority Data

Jul. 14, 2008  (TW) ................................ 97126626 A

(51) Int. Cl.
*G06F 3/041* (2006.01)
(52) U.S. Cl. .......................... 345/173; 345/174; 715/700
(58) Field of Classification Search .......... 345/156–173; 715/700
See application file for complete search history.

(56) References Cited

U.S. PATENT DOCUMENTS

| 7,502,017 B1* | 3/2009 | Ratzlaff et al. | 345/173 |
| 2003/0001899 A1* | 1/2003 | Partanen et al. | 345/800 |
| 2003/0071850 A1* | 4/2003 | Geidl | 345/781 |
| 2006/0077188 A1* | 4/2006 | Byun | 345/179 |

* cited by examiner

*Primary Examiner* — Amare Mengistu
*Assistant Examiner* — Premal Patel
(74) *Attorney, Agent, or Firm* — Ladas & Parry LLP

(57) ABSTRACT

An input method using a touchscreen of an electronic device includes enabling the touchscreen to display thereon a writing track and to open a window that also shows the writing track when the touchscreen detects the writing track thereon, and enabling the touchscreen to close the window when the touchscreen does not detect another writing track thereon within a predetermined time period. An electronic device for performing the input method is also disclosed.

7 Claims, 4 Drawing Sheets

INPUT METHOD USING A TOUCHSCREEN OF AN ELECTRONIC DEVICE

CROSS-REFERENCE TO RELATED APPLICATION

This application claims priority of Taiwanese application no. 097126626, filed on Jul. 14, 2008.

BACKGROUND OF THE INVENTION

1. Field of the Invention

This invention relates to an input method, more particularly to an input method using a touchscreen of an electronic device.

2. Description of the Related Art

A conventional electronic device, such as a personal digital assistant (PDA), includes a touchscreen, on which a user may write a character with the use of a stylus. Since a stylus has a sharp tip, the user is able to see his/her writing tracks displayed on the touchscreen while writing on the touchscreen using a stylus even when he/she writes in a small size. Many users, however, prefer to use their fingertips instead of a stylus. Since a fingertip is blunt, when writing a relatively complicated Chinese character on the touchscreen, the user is required to write in a large size so as to be able to see his/her writing tracks displayed on the touchscreen while writing on the touchscreen using his/her fingertip. As such, little information is displayed at a time on the touchscreen.

SUMMARY OF THE INVENTION

Therefore, the main object of the present invention is to provide an input method that can overcome the aforesaid drawback of the prior art.

Another object of the present invention is to provide an electronic device that performs the input method.

According to an aspect of the present invention, an input method using a touchscreen of an electronic device comprises:

A) when the touchscreen detects a writing track thereon, enabling the touchscreen to display thereon the writing track and to open a window that also shows the writing track; and B) when the touchscreen does not detect another writing track thereon within a predetermined time period, enabling the touchscreen to close the window.

According to another aspect of the present invention, an electronic device comprises a touchscreen and a processing unit. The touchscreen is operable so as to detect a writing track thereon. The processing unit is coupled to the touchscreen, and controls the touchscreen to display thereon the writing track and to open a window that also shows the writing track. The processing unit further controls the touchscreen to close the window when the touchscreen does not detect another writing track thereon within a predetermined time period.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
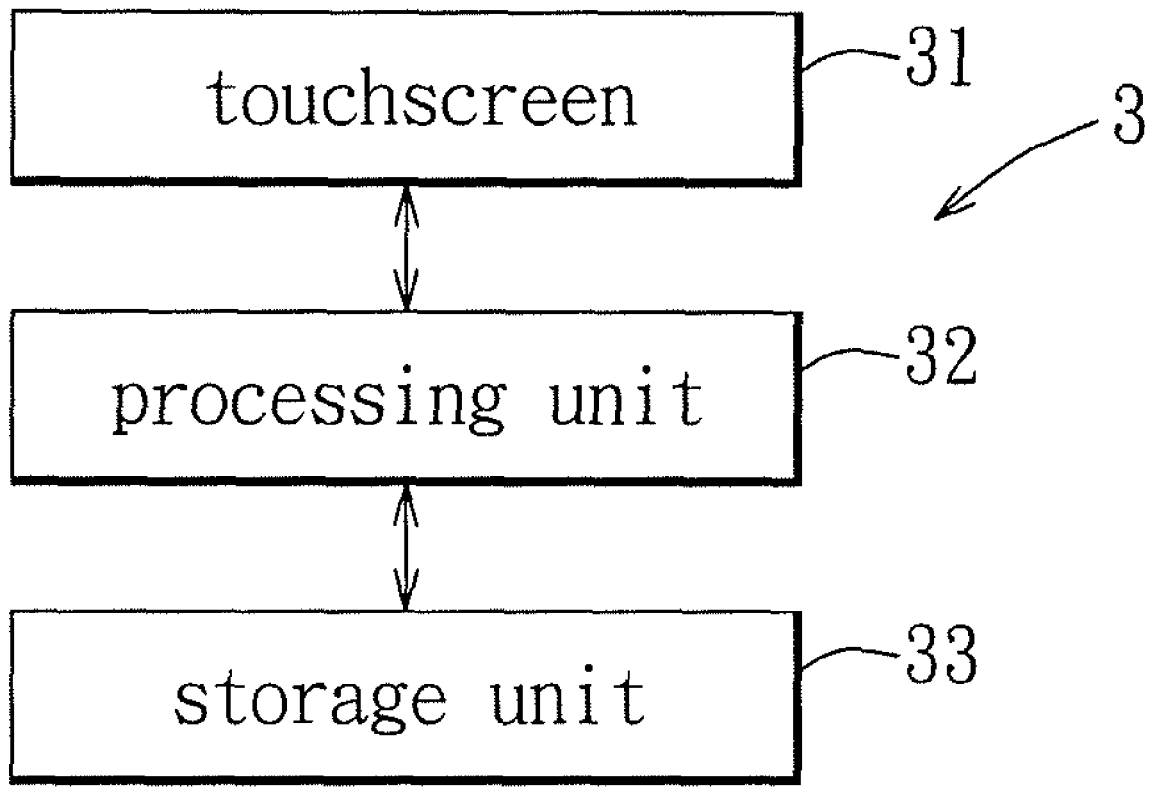
FIG. 1 is a block diagram of the preferred embodiment of an electronic device according to this invention.

Referring to FIG. 1, the preferred embodiment of an electronic device 3 according to this invention is shown to include a touchscreen 31 and a processing unit 32.

The electronic device 3 of this invention is a portable electronic device, such as a personal digital assistant (PDA), a mobile phone, or a navigating device.

The touchscreen 31 includes a liquid crystal display (LCD) (not shown), and a transparent capacitive-type touch panel (not shown) disposed on the LCD. In this embodiment, the touchscreen 31 is operable so as to detect a touch thereon, such as of a user's fingertip or a stylus, so as to generate a touch signal that corresponds to the touch detected thereby, and so as to send the touch signal generated thereby to the processing unit 32.

Since the touchscreen 31 is known in the art, and since the feature of the invention does not reside in the particular configuration of the same, a detailed description thereof will not be provided herein for the sake of brevity.

The processing unit 32 is connected to the touchscreen 31, generates image information based on the touch signal sent thereto by the touchscreen 31, and controls the touchscreen 31 to display thereon the image information generated thereby.

Figure 2:
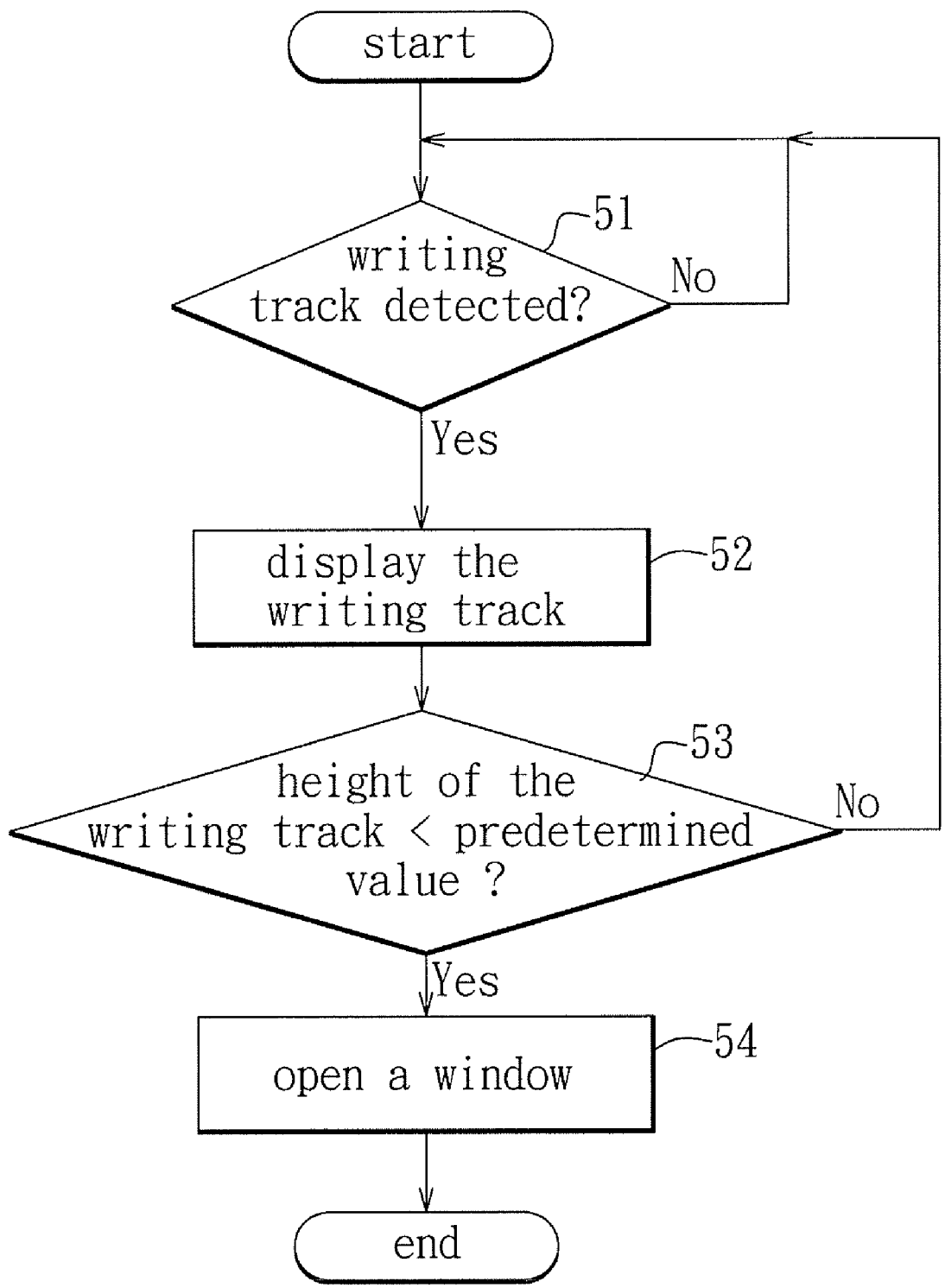
FIG. 2 is a flowchart of the preferred embodiment of an input method using a touchscreen of the electronic device shown in FIG. 1.

The preferred embodiment of an input method to be implemented using the aforementioned electronic device 3 according to this invention will now be described with further reference to FIG. 2.

In step 51, when the processing unit 32 determines that the touchscreen 31 detects a writing track, the flow proceeds to step 52. Otherwise, this step is repeated.

It is noted that, when the touchscreen 31 detects the writing track, the touchscreen 31 generates a touch signal, which corresponds to the writing track detected thereby, and sends the touch signal generated thereby to the processing unit 32. As such, in this step, the processing unit 32 determines that the touchscreen 31 detects the writing track when the processing unit 32 receives the touch signal from the touchscreen 31.

In step 52, the processing unit 32 controls the touchscreen 31 to display thereon the writing track.

In this step, the processing unit 32 first generates image information based on the touch signal received thereby and then controls the touchscreen 31 to display the image information generated thereby.

In step 53, when the processing unit 32 determines that a height of the writing track is less than a predetermined value, the flow proceeds to step 54. Otherwise, the flow goes back to step 51.

In step 54, the processing unit 32 controls the touchscreen 31 to open a window that also shows the writing track.

It is noted that, in this step, the window is a floating window displayed proximate to the writing track shown on the touchscreen 31.

It is further noted that, after this step, when the processing unit 32 determines that the touchscreen 31 does not detect another writing track thereon within a predetermined time period, i.e., the user has lifted his/her finger from the touchscreen 31 and stopped writing on the touchscreen 31 for a time period that exceeds the predetermined time period, the processing unit 32 controls the touchscreen 31 to close the window.

The electronic device 3 further includes a storage unit 33 that is connected to the processing unit 32, and that stores program instructions therein, which when executed cause the electronic device 3 to perform the input method of this invention. In this embodiment, the storage unit 33 may be a read only memory (ROM) or a flash memory.

Figure 3:
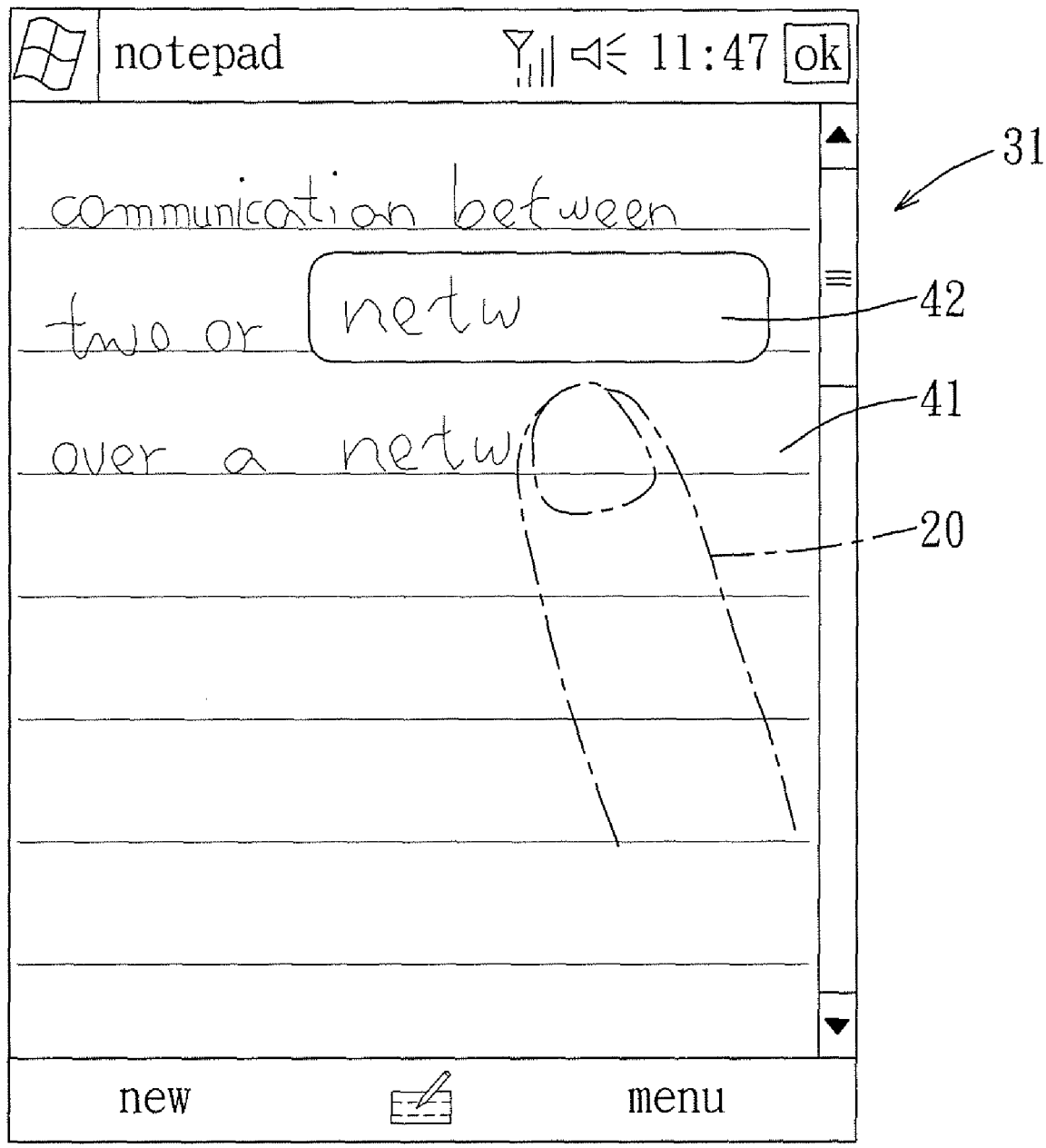
FIG. 3 is a schematic diagram illustrating opening of a window, which shows writing tracks detected by the touchscreen.

As an illustrative example of an application of the input method of this invention, with further reference to FIG. 3, after an application program 41, e.g., a notepad, is launched and the program instructions in the storage unit 33 are executed, suppose the user writes a character "w" on the touchscreen 31 using his/her fingertip 20 or a stylus (not shown). Then, in step 51, a writing track of the character "w" is detected, and thus, in step 52, the character "w" is shown on the notepad 41. Moreover, suppose that, in step 53, the height of the writing track of the character "w" is determined to be less than the predetermined value, e.g., one centimeter. In this case, a floating window 42, which also shows the writing track of the character "w", is opened in step 54 in the vicinity of the character "w" shown on the notepad 41. Further, suppose now that, after step 54, another writing track is not detected within the predetermined time period, e.g., two seconds. Hence, the window 42 is closed.

The electronic device 3 further includes an enable/disable key 34 (see FIG. 4), which when activated disables writing of writing tracks detected by the touchscreen 31 on the notepad 41. In this embodiment, the enable/disable key 34 is a virtual key displayed on the touchscreen 31.

In an alternative embodiment, the enable/disable key 34 is a physical key mounted on the electronic device 3.

Figure 4:
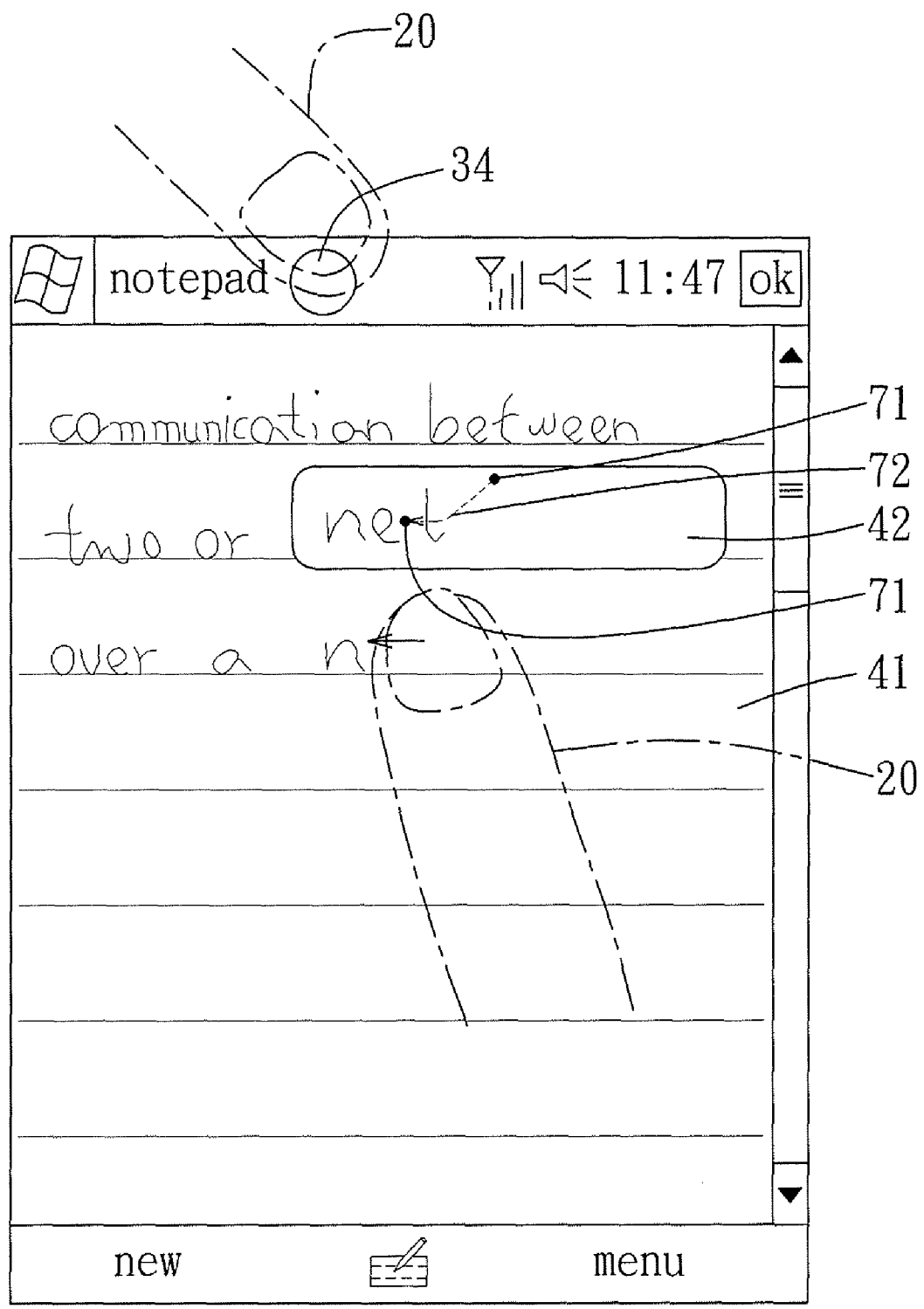
FIG. 4 is a schematic diagram illustrating relocation of an input point displayed on the touchscreen.

As in the above example, with further reference to FIG. 4, suppose an incomplete character is written on the notepad 41. Suppose further that the user wants to finish writing the incomplete character. In this case, the user first activates the enable/disable key 34. At this state, when the user puts his/her fingertip 20 on the touchscreen 31 adjacent to the incomplete character, the processing unit 32 controls the touchscreen 31 to open a window 42, which shows a latest portion of writing tracks written on the notepad 41. At this time, the user may relocate an input point 71 to an appropriate position on the notepad 41 by dragging the input point 71 using his/her fingertip 20. It is noted that, since the enable/disable key 34 is activated, a writing track 72 detected by the touchscreen 31 during the dragging movement of the user's fingertip 20 on the touchscreen 31 is not written on the notepad 41. The writing track 72, however, is shown in the window 42 to thereby facilitate relocation of the input point 71 by the user. Thereafter, the user may deactivate the enable/disable key 34 to finish writing the incomplete character.

From the above description, when the user writes on the touchscreen 31, a window 42, which shows a writing track detected by the touchscreen 31, is opened. As such, the user is not required to write in a large size so as to be able to see his/her writing tracks while writing on the touchscreen 31. In other words, the user is able to see his/her writing tracks in the window 42 while writing on the touchscreen 31. As such, the user may write in a small size. Hence, more image information may be displayed at a time on the touchscreen 31.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An input method using a touchscreen of an electronic device, comprising:
   A) when the touchscreen detects a writing track thereon, enabling the touchscreen to display thereon the writing track and to open a window that also shows the writing track;
   B) when the touchscreen does not detect another writing track thereon within a predetermined time period, enabling the touchscreen to close the window; and
   C) providing an enable/disable key, which when activated enables the touchscreen to show a writing track detected thereby in the window only.

2. The input method as claimed in claim 1, wherein step A) further includes determining a height of the writing track, and the window is opened only when it is determined that the height of the writing track is less than a predetermined value.

3. The input method as claimed in claim 1, wherein, in step A), the window further shows a latest portion of writing tracks displayed on the touchscreen.

4. An electronic device, comprising:
   a touchscreen operable so as to detect a writing track thereon;
   a processing unit coupled to said touchscreen, and controlling said touchscreen to display thereon the writing track and to open a window that also shows the writing track, said processing unit further controlling said touchscreen to close the window when said touchscreen does not detect another writing track thereon within a predetermined time period; and
   an enable/disable key, said processing unit further controlling said touchscreen to show a writing track detected by said touchscreen only in the window when said enable/disable key is activated.

5. The electronic device as claimed in claim 4, wherein said processing unit determines a height of the writing track, and controls said touchscreen to open the window only when it is determined thereby that the height of the writing track is less than a predetermined value.

6. The electronic device as claimed in claim 4, wherein said processing unit further controls said touchscreen to show a latest portion of writing tracks displayed on said touchscreen in the window.

7. A computer program product comprising:
   a non-transitory machine readable storage medium having program instructions stored therein which when executed cause an electronic device to perform a set of operations including:
   enabling a touchscreen to display a writing track and to open a window that also shows the writing track when the touchscreen detects the writing track thereon;
   enabling the touchscreen to close the window when the touchscreen does not detect another writing track thereon within a predetermined time period; and
   providing an enable/disable key, which when activated enables the touchscreen to show a writing track detected thereby in the window only.

* * * * *